Dec. 29, 1925.
A. HIRSCHMAN
1,567,440
BRAKE RELEASE MECHANISM FOR MOTOR VEHICLES
Filed Nov. 4, 1925
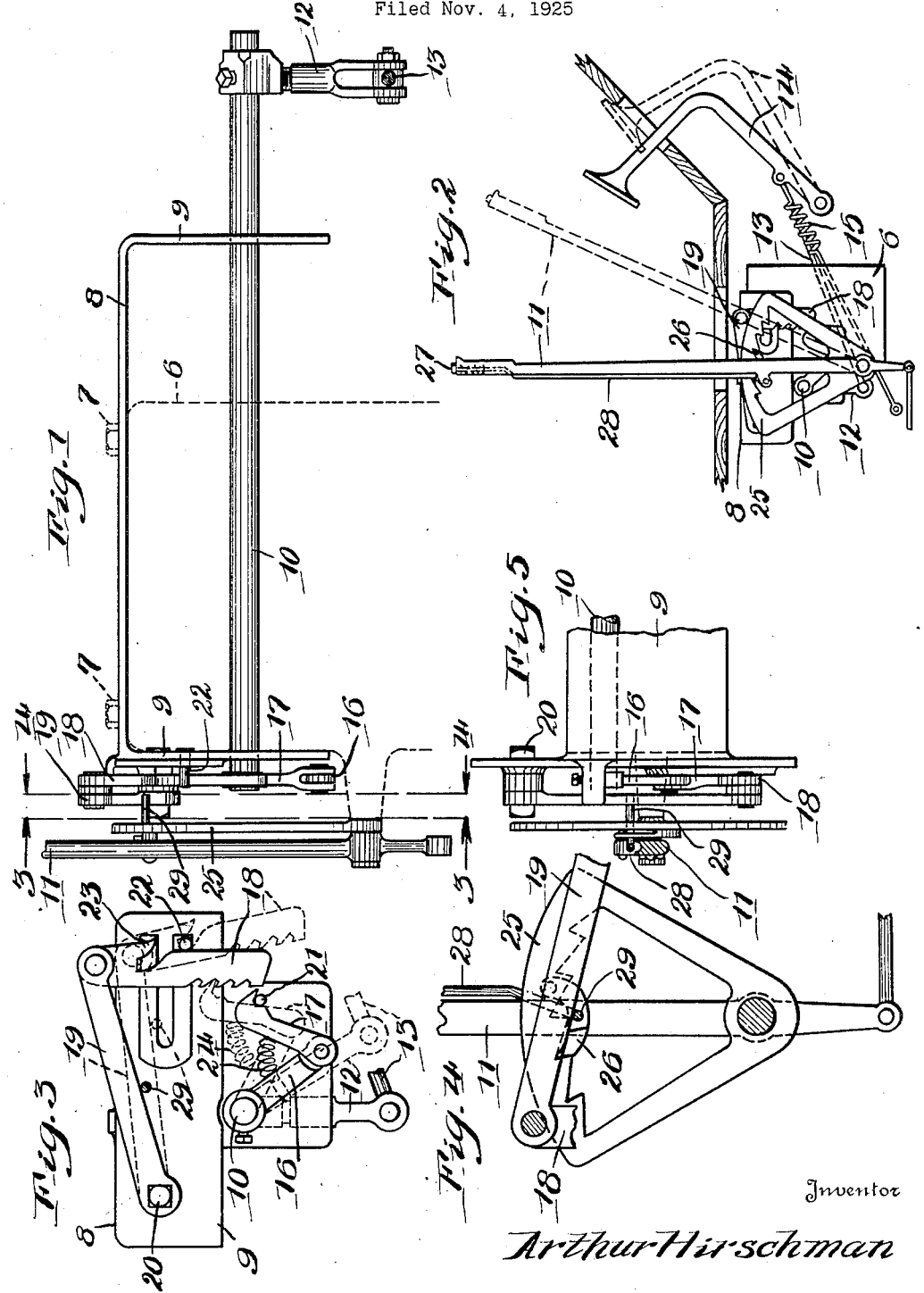
Inventor
Arthur Hirschman
By Stryker & Stryker
Attorneys Patented Dec. 29, 1925.

1,567,440

UNITED STATES PATENT OFFICE.

ARTHUR HIRSCHMAN, OF ST. PAUL, MINNESOTA.

BRAKE-RELEASE MECHANISM FOR MOTOR VEHICLES.

Application filed November 4, 1925. Serial No. 66,715.

*To all whom it may concern:*

Be it known that I, ARTHUR HIRSCHMAN, a citizen of the United States, residing at St. Paul, in the county of Ramsey and State of Minnesota, have invented new and useful Improvements in Brake-Release Mechanism for Motor Vehicles, of which the following is a specification.

This invention relates to an attachment for motor vehicles, adapted to automatically release a brake for stopping and retarding the vehicle whenever the vehicle is started from rest, the device being an improvement upon the invention described and claimed in my Patent No. 1,520,818, dated December 30, 1924.

It is my object to facilitate the proper operation of motor vehicles and at the same time to obviate unnecessary wear on the brakes and driving mechanism by guarding against inadvertent driving with the brakes in applied position.

A further object is to provide such an attachment, adapted to permit shifting of the transmission or change speed gears when the clutch is depressed and while allowing the hand or emergency brakes to remain in applied position, and then to automatically release the brakes when the clutch lever is returned as in starting the vehicle from rest.

This invention also includes certain other novel features of construction, which will be more fully pointed out in the following specification and claims.

The invention will be best understood by reference to the accompanying drawings, in which Figure 1 is a front elevation of my improved attachment, Fig. 2 is a side elevation of the same mounted on a vehicle, and as viewed from the left of Figure 1; Fig. 3 is a section taken on the line 3—3 of Fig. 1; Fig. 4 is a section taken on the line 4—4 of Fig. 1 and Fig. 5 is a fragmentary plan view showing the brake lever and adjacent parts of the mechanism.

As illustrated, my device is adapted to be secured to the transmission case 6, which is commonly provided with a cover secured in place by bolts 7 (Fig. 1). I utilize the rearward pair of the bolts 7 to secure the frame 8 of my device upon the vehicle. This frame 8 has pendant members 9, projecting downward at the sides of the transmission case 6, and arranged to support a horizontal shaft 10 and other movable parts of my device. The shaft 10 terminates at one end near the hand brake 11 of the motor vehicle and its other end is connected by a crank 12 and rod 13, with the clutch pedal or lever 14 of the vehicle. A suitable coiled spring 15 is commonly provided on motor vehicles to maintain the clutch pedal in elevated position, viz., in position to connect the motor with the transmission mechanism.

At its end opposite the crank 12, the shaft 10 carries a second crank 16. A dog 17 is pivotally supported on the crank 16 and arranged to engage a rack bar 18, which is slidable substantially vertically upon the outer surface of one of the frame members 9. This rack bar 18 is pivotally suspended from an arm 19, which is in turn mounted on a pivot pin 20 on the frame member 9. To guide and limit downward movement of the dog 17, a stop pin 21 is provided and swinging movement of the rack bar 18 away from the dog 17 is limited by a fixed pin 22. When the rack bar 18 is moved downward, as hereinafter described, a cam surface 23 on said bar strikes the pin 22, so as to cause the lower end of said bar to move away from the dog 17, as shown in dotted lines in Fig. 3. The dog 17 is held in contact with the pin 21 by a suitable coiled spring 24.

Mounted between the end of the shaft 10 and brake 11, is the usual toothed segment or rack 25, and said brake lever carries a pawl 26 for engagement with the teeth of segment 25. The brake lever 11 is normally held in the forward, dotted line position shown in Fig. 2, by the usual spring (not shown) and when said brake lever is moved to full line or applied position, the dog 26 engages a tooth of the segment 25. A suitable button 27 on the lever 11 is connected by a rod 28 with the pawl 26, to facilitate releasing said pawl from the segment 25 when the brake is to be released, the dog being normally held in engagement with the teeth of the rack 25 by a coiled compression spring in the handle of the lever 11.

Projecting inward from the pawl 26 is a pin 29 arranged to actuate the arm 19 to elevate the rack bar 18 when the brake lever 11 is moved to applied or rearward position. This pin 29 is conveniently formed from an end of the rod 28 for actuating the dog 26. That is to say, the end of the rod 28, which extends through and is pivotally connected to the pawl 26, is allowed to project from said pawl a distance sufficient to reach beneath the arm 19.

*Operation.*

In use, when the emergency or hand brake lever 11 is applied, it is held in applied position in the usual manner by engagement of the pawl 26 with the toothed segment 25, and during the rearward movement of the lever 11, the pin 29 raises the arm 19. This, as will be readily understood, causes the pin 22 to move the rack 18 to substantially vertical position or from dotted to solid line position, shown in Fig. 3. Now when the clutch pedal 14 is depressed to disconnect the transmission gears from the motor, the shaft 10 will be operated through the rod 13 and crank 12 to raise the dog 17 into engagement with the teeth of the rack 18. Upon the release of the clutch pedal 14, the dog 17 is drawn downward in engagement with the rack 18 and pulls the arm 19 and pin 29 downward. The pin 29 is thus actuated to move the pawl 26 out of engagement with the rack 25 and release the brake. When the hand lever 11 is in brake release position, the rack 18 is in its dotted line position where it is out of the path of the dog 17, so that movement of the clutch merely oscillates the dog 17 from dotted to full line position and return (Fig. 3).

The present invention allows the application of the hand brake at any time, whether the clutch lever is depressed or elevated, and insures releasing of the brake when the clutch is operated to connect the motor with the transmission gears. This, as will be readily understood, practically prevents inadvertent driving, with the brake in applied position. Further, the invention greatly facilitates driving, particularly where there are hills and traffic congestion. Thus, if it becomes necessary to stop while ascending a hill, the brake lever 11 can be applied to stop the vehicle, leaving the driver's feet free to operate a starting device or the clutch or other mechanism. While the brake is in applied position, the clutch lever may be depressed and the gears may be shifted with the motor running. Subsequently the brakes are automatically released as the power is transmitted to the wheels by the upward return of the clutch pedal.

My device may be quickly and easily mounted on certain of the common types of motor vehicles by merely securing the bolts 7, extending the rod 28 so as to constitute the pin 29 beneath the arm 19, and connecting the clutch pedal with the crank 12 by means of the rod 13. By suitable minor changes, the invention may be applied to any of the common types of motor vehicles.

It will be evident that my invention may be operated electrically or by hydraulic means, as well as by the mechanical connection with the clutch lever shown. Thus the crank 12 could be connected to a hydraulic cylinder or to the plunger of an electric solenoid under control of an air valve or electric switch operated by the clutch lever. The hydraulic actuating means for the brake releasing mechanism is considered advantageous where, as is frequently the case with the newer types of cars, the brakes are actuated hydraulically.

Having described my invention what I claim as new and desire to protect by Letters Patent is:

1. In a brake releasing device for a motor vehicle having transmission mechanism, a clutch lever and a brake normally in released position, said clutch lever being adapted to be moved to either operatively connect or disconnect the motor and transmission mechanism, means for maintaining said brake in applied position, and means for releasing said brake operable upon the movement of said clutch lever from disconnecting to connecting position.

2. In a brake releasing device for a motor vehicle having transmisison mechanism, a clutch lever and a brake normally in released position, said clutch being adapted to be moved to either connect or disconnect the motor and transmission mechanism, a toothed member and pawl arranged to maintain said brake in applied position, and means for actuating said pawl to release said brake operable upon the movement of said clutch lever from disconnecting to connecting position.

3. In brake releasing mechanism for a motor vehicle having change speed gears, a clutch lever, and a brake normally in released position, said clutch being adapted to be moved to either connect the motor with or disconnect the same from said change speed gears, means for maintaining said brake in applied position, means for releasing said brake connected to and operable upon a movement of said clutch lever, and means for permitting the shifting of said gears while said clutch lever is in position to disconnect said motor from said change speed gears.

4. In brake releasing mechanism for motor vehicles, the combination with a normally released brake, a clutch lever, and change speed gears, adapted to be connected with and disconnected from the motor by means of said clutch lever, of means adapted to maintain said brake in applied position, a dog operatively connected with said clutch lever, a toothed member movable by said brake into the path of said dog and means connecting said dog with said clutch lever, whereby said dog is actuated to engage said toothed member and release said brake upon the movement of said clutch lever when the brake is in applied position.

5. In brake releasing mechanism for motor vehicles, the combination with a normally released brake, a clutch lever and change speed gears, adapted to be connected with and disconnected from the motor by means of said clutch lever, of a toothed member and pawl adapted to maintain said brake in applied position, a dog operatively connected with said clutch lever, a rack movable by said brake into the path of said dog and means connecting said dog with said clutch lever, whereby said dog is actuated to engage said rack and release said brake upon the movement of said clutch lever from disconnecting to connecting position.

6. In brake releasing mechanism for motor vehicles, the combination with a normally released brake, a clutch lever and change speed gears, adapted to be connected with and disconnected from the motor by means of said clutch lever, of means adapted to maintain said brake in applied position, a dog operatively connected with said clutch lever, a toothed member movable by said brake into the path of said dog, means for normally maintaining said member out of the path of said dog when the brake is in released position, and means connecting said dog with said clutch lever, whereby said dog is actuated to engage said toothed member and release said brake upon the movement of said clutch lever.

In testimony whereof, I have hereunto signed my name to this specification.

ARTHUR HIRSCHMAN.